(12) United States Patent  
Chuang et al.

(10) Patent No.: US 8,755,920 B2
(45) Date of Patent: Jun. 17, 2014

(54) AUDIO RECORDING ELECTRONIC BOOK APPARATUS AND CONTROL METHOD THEREOF

(75) Inventors: Kai-Cheng Chuang, Tainan (TW); Tzu-Ming Wang, Fengshan (TW); Po-Wen Hsiao, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 513 days.

(21) Appl. No.: 12/686,818

(22) Filed: Jan. 13, 2010

(65) Prior Publication Data

US 2011/0093103 A1 Apr. 21, 2011

(30) Foreign Application Priority Data

Oct. 21, 2009 (TW) ................................ 98135587 A

(51) Int. Cl.
*G06F 17/00* (2006.01)
(52) U.S. Cl.
USPC .............................. 700/94; 715/716; 715/210
(58) Field of Classification Search
USPC ..................... 700/94; 715/210, 716
See application file for complete search history.

(56) References Cited

U.S. PATENT DOCUMENTS

| 5,761,681 | A  | * | 6/1998 | Huffman et al. ............... 715/210 |
| 6,438,523 | B1 |   | 8/2002 | Oberteuffer et al. |
| 7,107,533 | B2 | * | 9/2006 | Duncan et al. ................. 715/210 |

FOREIGN PATENT DOCUMENTS

| TW | M316461 | 1/1996 |
| TW | 518482 | 1/2003 |
| TW | 2008031625 | 6/2008 |
| WO | WO 2008031625 | 3/2008 |

* cited by examiner

*Primary Examiner* — Jesse Elbin
(74) *Attorney, Agent, or Firm* — Jianq Chyun IP Office

(57) ABSTRACT

The present invention relates to an audio recording electronic book apparatus featuring a recording function to take an audio note, comprising a display module for displaying the contents of an electronic book; a memory unit for storing at least one electronic book file; a micro process unit for reading an electronic book file and displaying it on the display module; a recording/broadcasting module for inputting an audio note after startup and storing in the memory unit as an audio data file; and a correspondence table for recording the linkage relationship related to the audio data file and the electronic book file.

20 Claims, 4 Drawing Sheets

AUDIO RECORDING ELECTRONIC BOOK APPARATUS AND CONTROL METHOD THEREOF

BACKGROUND OF THE INVENTION

1. Field of the Invention

The present invention relates to a display device; in particular, the present invention relates to an electronic book apparatus featuring a recording function and a touch input function for note taking.

2. Description of Related Art

The electronic book apparatus is a new type of display devices manufactured by using a bistable displayer which enables electrical power-saving capability because of the bistability thereof. Additionally, the electronic book apparatus can be configured with an extremely large memory space allowing to store a great amount of electronic books, and also provides features of small and slim sizes, convenient operations as well as suitability for long-time readings and the like, further offering advantages in terms of convenient access to the contents of electronic books via wireless transmissions, such that the electronic book apparatus has now become popular progressively and has been applied widely.

However, even with the aforementioned advantages in the electronic book apparatus, it is still unable to satisfactorily meet the requirements on reading and learning for numerous students and readers. For many students and readers, they usually have to carry various books around to facilitate effective and complete learning, while the electronic book apparatus may eliminate or reduce such a carry-on burden in weight caused by printed books and also provides a display device suitable for long-time readings. Nevertheless, for general readers or students, taking notes or learning remarks during reading or learning may facilitate more efficient reviews or prompts for future individual studies, yet currently available electronic book apparatuses or other types of display devices can only provide the display function, lacking of features for taking notes or learning remarks; hence general readers or students are not allowed to promptly take notes during classes or any learning annotations in real-time, or else other tools, e.g., papers and pens, are needed for recording. For common users, this may cause great inconvenience in use, further reducing the effect of student learning and willingness of use. Besides, since notes or annotations recorded by means of papers can not be related with the contents of the electronic book apparatus, misplacement of notes or remarks, or even problems of paper note or remark losses, may occur.

SUMMARY OF THE INVENTION

An electronic book apparatus according to an embodiment of the present invention comprises: a display module; a memory unit, storing an electronic book file; a micro process unit, connected to the memory unit and the display module to read the electronic book file and display a part of the contents of the electronic book file on the display module; a recording/broadcasting module, connected to the micro process unit to input an audio note, in which the micro process unit receives the audio note and stores it in the memory unit as an audio data file; and a correspondence table, connected to the micro process unit to record a linkage data which records the linkage relationship between the audio data file and the electronic book file.

An electronic book apparatus according to an embodiment of the present invention comprises: a display module, displaying the contents of an electronic book; a touch module, generating a text note or a graphic note; and a recording/broadcasting module, generating an audio note; wherein the text note, the graphic note and the audio note respectively have a corresponding linkage relationship to the contents of the electronic book.

A control method for an electronic book apparatus according to an embodiment of the present invention comprises the following steps: accessing an electronic book file and displaying the electronic book file on a display module; selecting a part of the contents displayed on the display module; opening a recording/broadcasting module to generate an audio data file; and storing the generated audio data file in a memory unit and generating a linkage relationship corresponding to the selected contents, being stored in the correspondence table.

DETAILED DESCRIPTION OF THE PREFERRED EMBODIMENTS

Figure 1:
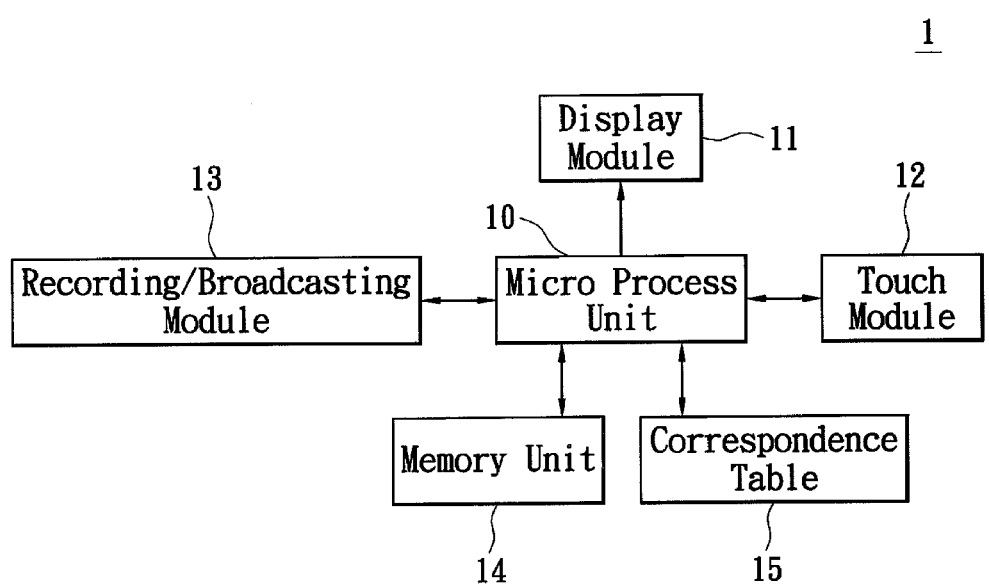
FIG. 1 is a block diagram of the electronic book apparatus according to an embodiment of the present invention.

As shown in FIG. 1, the electronic book apparatus 1 comprises, a micro process unit 10 which generates a control signal, reads an electronic book file, and reads/stores an audio data file, a text data file and a graphic image file; a display module 11 which displays the contents of the electronic book files or the contents of the text data/graphic image files read by the micro process unit 10; a touch module 12 which allows a user to input a control signal or a text/graphic note; a recording/broadcasting module 13 which provides recording and broadcasting functions to generate an audio note and broadcast based on the contents of the audio data file read by the micro process unit 10; a memory unit 14 which stores the electronic book files, the text data/graphic image files inputted by the user, and the audio data file; and a correspondence table 15 which records the linkage relationship of the text data/graphic image file inputted by the user and the audio data file corresponding to a specific page number, a specific text or a specific figure within the referred electronic book.

Herein the display module 11 may be one of a liquid crystal display (LCD) panel or a bistable displayer which is taken as an embodiment for illustration according to the present invention; the touch module 12 may be one of a resistive touch panel, a capacitive touch panel, an electromagnetic touch panel or an optical touch panel and the like, and is placed over the display module 11; the recording/broadcasting module 13 consists of at least one recording component and one broadcasting component so as to perform recording and broadcasting functions; the correspondence table 15 may be an individual memory or integrated into the memory unit 14.

In use, the electronic book apparatus 1 is initially to be turned on and the micro process unit 10 reads out a list of electronic book files stored in the memory unit 14 and displays it on the display module 11. The user may input a control signal through the touch module 12 and select to open an electronic book file, and the micro process unit 10 accordingly opens the selected electronic book file and displays it on the display module 11. In the present embodiment, since a bistable displayer is used as the display module 11 for implementations, the display technology of electronic paper can be exploited by the bistable displayer; hence, inasmuch as the feature of the electronic paper, it consumes electrical power only when the screens need to be updated. Yet no power needs to be continuously supplied when no screen updates are required, so the present embodiment consumes extremely low amount of electrical power, thereby providing an advantageous electrical power-saving feature.

The embodiment of the present invention consists of a recording/broadcasting module 13 which enables recording and broadcasting functions. When the user wants to record, it is possible to input a control signal through the touch module 12 or a recording switch (not shown), and the micro process unit 10 accordingly drives the recording/broadcasting module 13 to record, and then the micro process unit 10 receives the audio note generated by the recording/broadcasting module 13 and stores the generated audio note in the memory unit 14 as an audio data file; meanwhile, a correspondence data is created at the correspondence table 15 to record the linkage relationship between the audio data file and the electronic book file or alternatively any specific pages, texts, figures or forms existing within the electronic book.

The user is only required to, after startup of the electronic book apparatus 1, open an electronic book file, assign therein any specific pages, specific texts, specific figures or forms etc. through the touch module 12 and then start the recording/broadcasting module 13 by means of the touch module 12 or a recording switch (not shown) to record. The micro process unit 10 stores the audio note generated by the recording/broadcasting module 13 in the memory unit 14 and creates a correspondence data in the correspondence table 15 in order to record the linkage relationship between the audio data file associated with the specific pages designated, specific texts selected, specific figures or forms chosen and so on. After completion of recording, an icon is shown on the side of the designated specific pages, specific texts, figures or forms in the electronic book thereby illustrating that such specific pages, specific texts, figures or forms have an audio data file connected therewith.

The user may touch on such an icon and a control signal can be accordingly generated through the touch module 12, and the micro process unit 10 accesses the corresponding audio data file in the memory unit 14 based on the control signal and then broadcasts the corresponding audio note via the recording/broadcasting module 13, so that the user is allowed to listen to the audio note corresponding to such specific pages, specific texts, figures or forms.

When the user browses the contents of the electronic book through the display module 11, it is possible to select any specific pages, specific texts, figures or forms through the touch module 12, choose the input function for the text/graphic note and generate a control signal. While the micro process unit 10 generates an edit-mode control window (not shown) on the display module 11 according to the control signal generated, thereby allowing the user to input texts or graphics by means of the touch module 12 (or else through a keyboard for text inputs). Upon completion of input by the user, the micro process unit 10 stores the contents held in the edit-mode control window into the memory unit 14 as a text/graphic image file; at the same time, a linkage relationship involving the text/graphic image file and the specific pages, specific texts, figures or forms etc. designated by the user is also recorded in the correspondence table 15. Meanwhile, after completion of recording, an icon is shown on the side of the specific pages, specific texts, figures or forms selected by the user in the electronic book, thereby illustrating that such specific pages, specific texts, figures or forms have a text/graphic image file connected therewith. The user may touch on the icon so as to generate a control signal by the touch module 12, thus the micro process unit 10 accesses the corresponding text/graphic image file in the memory unit 14 according to the control signal and displays on the display module 11 for browsing by the user.

In the embodiment of the present invention, the user is also allowed to activate the recording/broadcasting module 13 to record and open the edit-mode control window so as to simultaneously perform recording for an audio note, a text note or a graphic note. By way of simultaneous operating and recording the audio note, the text note or the graphic note, the user is enabled to annotate the information intended to be recorded more completely and efficiently, thereby preventing any possible losses.

In the embodiment of the present invention, it is also possible to use a set of camera module (not shown) to record an image note. Relevant approaches and means are well-known to those skilled ones in the art and herein omitted for brevity.

Figure 2A:
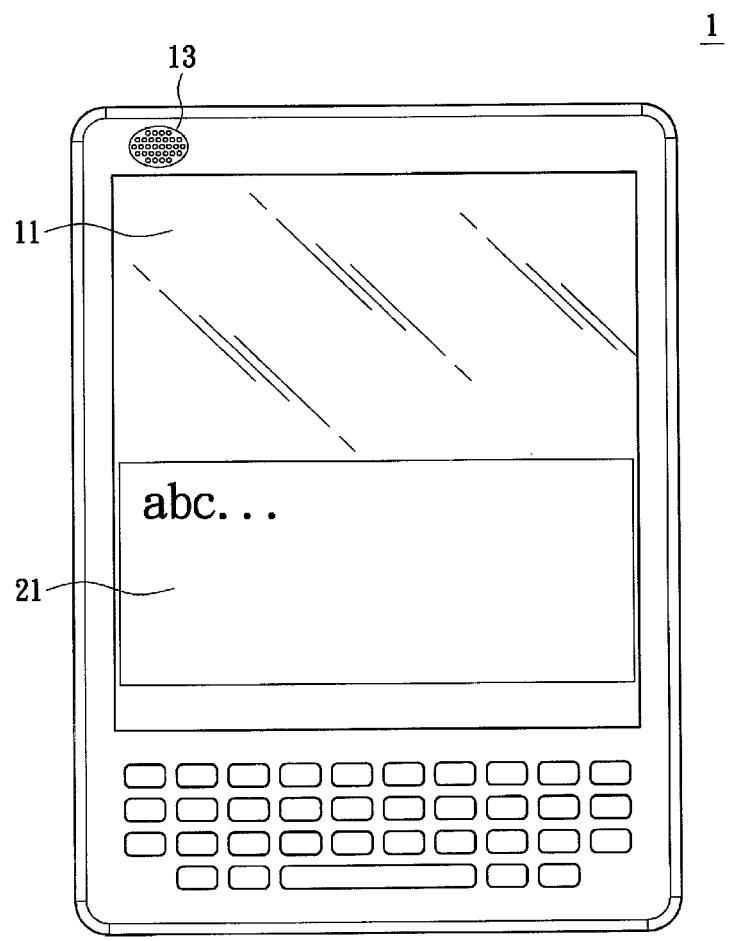
FIGS. 2A and 2B are schematic diagrams illustrating the implementation of the electronic book apparatus according to an embodiment of the present invention.
Figure 2B:
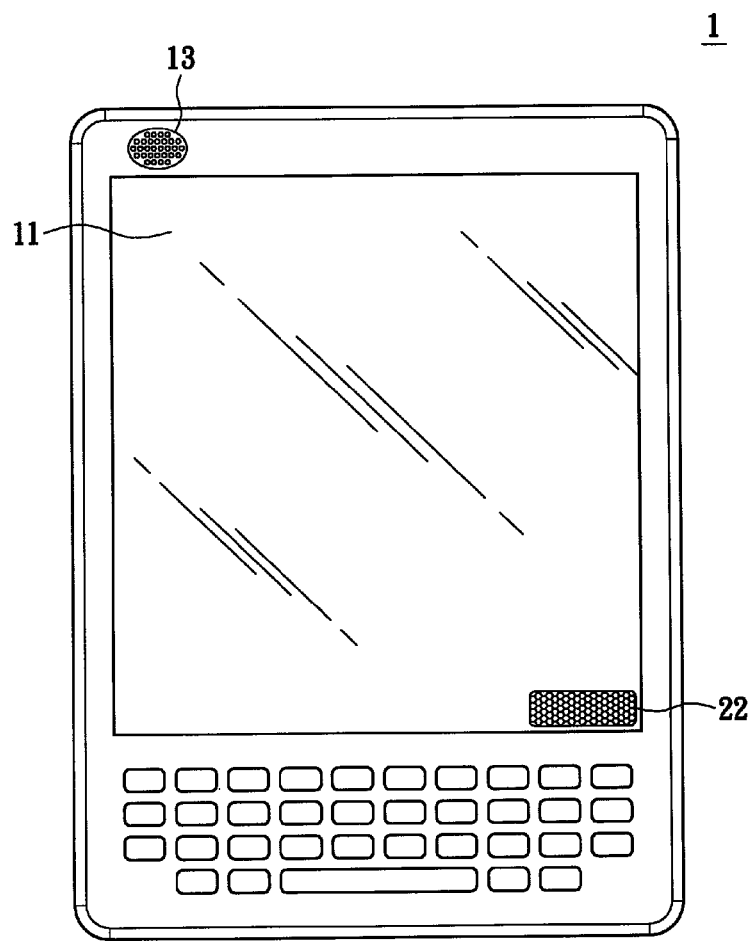

The electronic book apparatus 1 according to the embodiment of the present invention, as shown in FIG. 2A, may perform recording through the recording/broadcasting module 13 and opens an edit-mode control window 21 thereby allowing the user to input texts or graphics etc. by means of a finger or a touch pen in order to input an audio note, a text note or a graphic note and so forth. Furthermore, as shown in FIG. 2B, an icon 22 can be generated on the side of the specific pages, specific texts, specific figures or forms selected to illustrate that such specific pages, texts, figures or forms have an audio data file or a text/graphic image file connected therewith, so that the user is allowed to touch the icon 22 to open the corresponding audio data file or text/graphic image file.

Figure 3:
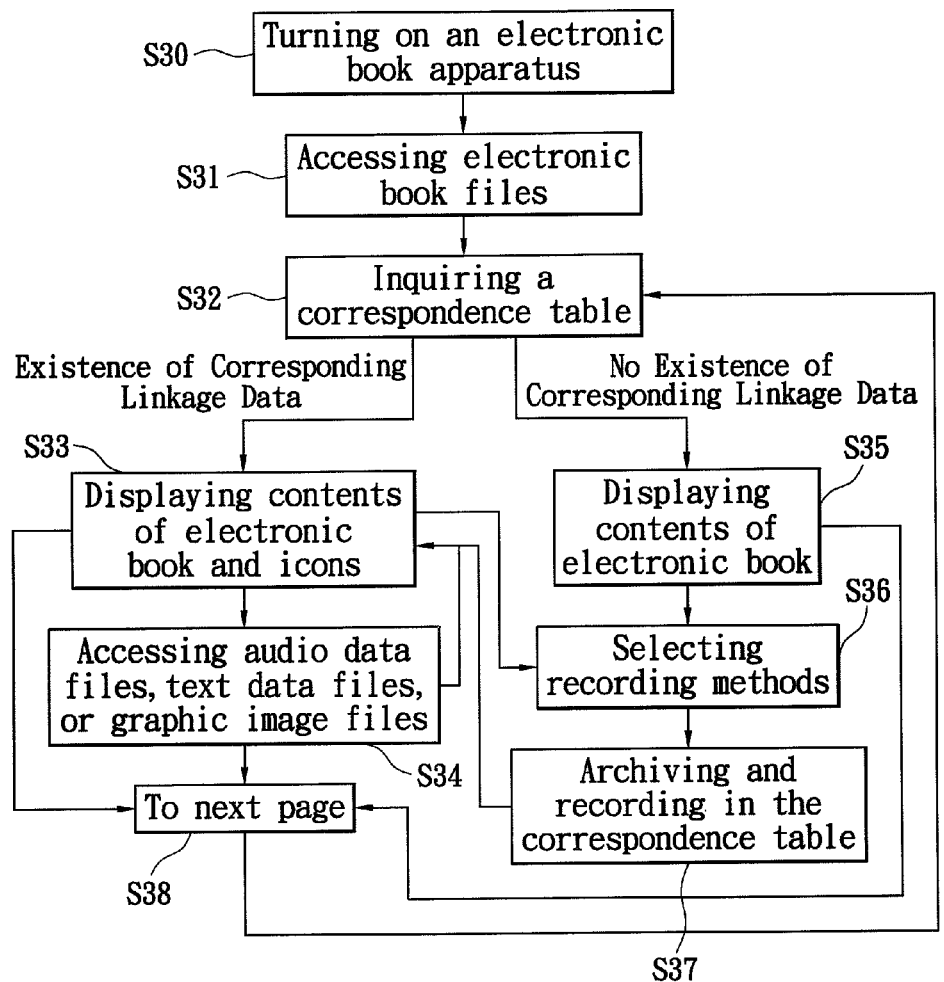
FIG. 3 is a control flowchart for the electronic book apparatus according to an embodiment of the present invention.

Referring conjunctively to FIGS. 1 to 3 for the electronic book apparatus 1 according to the embodiment of the present invention, the user initially turns on the electronic book apparatus 1, as shown in Step S30, then the micro process unit 10 reads out the list of electronic book files stored in the memory unit 14 and displays it on the display module 11. The user is only required to select the electronic book file intended to read so as to generate a control signal by the touch module 12, then the micro process unit 10 reads out the electronic book file intended to be opened from the memory unit 14 based on the control signal and displays the contents of the electronic book on the display module 11, as shown in Step S31. Meanwhile, upon accessing the electronic book file, the micro process unit 10 also looks for in the correspondence table 15 the linkage data corresponding to any one of the pages or the texts, figures and forms existing within the electronic book file, as shown in Step S32. Suppose any linkage data corresponding to the pages of the electronic book file or alternatively to the texts, figures or forms for the contents thereof is found to be stored in the correspondence table 15, then the contents of the page and the icon 22 are simultaneously displayed on the display module 11, as shown in Step S33; in case no linkage data corresponding to the page is found, then the display module 11 displays the contents of the page, as shown in Step S35.

In displaying the contents of the electronic book and the icon as Step S33, the user needs only to touch on such icons 22 and a control signal can be generated by the touch module 12, and the micro process unit 10 reads/opens the corresponding audio data file or the text data/graphic image file in the memory unit 14 according to the control signal and broadcasts through the recording/broadcasting module 13 or displays on the display module 11, as shown in Step S34. If the user intends to browse the next page, it is possible to generate a control signal through the touch module 12 or a next page button (not shown), and the micro process unit 10 displays the contents of the next page on the display module 11 based on the control signal, as shown in Step S38; additionally, upon selecting the action of browsing the next page by the user, the operation step in the flowchart returns to Step S32 to re-inquire whether any corresponding linkage data exists for the next display page or else for the contents thereof.

In case that no linkage data corresponding to the page is found in Step S32, then the micro process unit 10 directly displays the contents of the page, as shown in Step S35. At this moment, if the user needs to record a note, it is possible to select the specific pages, specific texts, figures or forms etc. and choose the intended recording method, as shown in Step S36. Upon completion of recording, the micro process unit 10 stores the audio notes and text/graphic notes in the memory unit 14 respectively for generating a corresponding audio data file or a text/graphic image file, and generates a corresponding linkage data in the correspondence table 15 to record the linkage relationship involving the audio data file or text/graphic image file and the specific pages, specific texts, figures or forms selected, as shown in Step S37. After completion of note filing by the user, the icon 22 can be displayed on the side of the specific pages, specific texts, figures or forms selected to illustrate the existence of the corresponding note file, as shown in Step S33.

In the electronic book apparatus 1 according to the embodiment of the present invention, it is possible as well to edit such audio data files or text/graphic image files, or otherwise to annotate audio noted or text/graphic notes on the other texts, figures or forms etc. of the same page, as shown in Steps S33 to S36. Therefore, by applying the electronic book apparatus 1 according to the embodiment of the present invention, the user is allowed to record notes or annotations in an untrammeled and efficient fashion.

What is claimed is:

1. An electronic book apparatus, comprising:
   a display module;
   a memory unit, storing an electronic book file;
   a micro process unit, being connected to the memory unit and the display module, for reading the electronic book file and displaying contents of the electronic book file on the display module;
   a recording/broadcasting module, being connected to the micro process unit, for inputting an audio note being received by the micro process unit and storing the audio note in the memory unit as an audio data file;
   an edit-mode control window generated on the display window module; and
   a correspondence table, being connected to the micro process unit, for recording a linkage data in accordance with the corresponding linkage relationship between the audio data file and the electronic book file,
   wherein the recording/broadcasting module is activated and the edit-mode control window is opened for simultaneously recording the audio note and at least one of a text note and a graphic note both inputted in the edit-mode control window by a user corresponding to the electronic book apparatus.

2. The apparatus according to claim 1, wherein the display module is one of a liquid crystal display (LCD) panel or a bi-stable display panel, and the bi-stable display panel is an electronic paper.

3. The apparatus according to claim 1, wherein the recording/broadcasting module consists of a recording component and a broadcasting component.

4. The apparatus according to claim 1, wherein the linkage data records a corresponding linkage relationship of the audio data file associated with the contents, and the contents can be one of a page, a text, a figure or a form within the electronic book file.

5. The apparatus according to claim 4, further comprising a touch module being disposed over the display module and being connected to the micro process unit so as to receive the at least one of the text note and the graphic note and store in the memory unit for respectively producing a text data file and a graphic image file, and the correspondence table being constituted by the linkage data generated for recording the corresponding linkage relationship of one of the text data file and the graphic image file associated with the contents of the electronic book file.

6. The apparatus according to claim 5, wherein the display module simultaneously displays the electronic book file and an icon to indicate that one of the audio data file, the text data file and the graphic image file has a corresponding linkage relationship with respect to the contents of the electronic book file.

7. The apparatus according to claim 6, wherein the icon is capable of accessing one of the audio data file, the text data file and the graphic image file, in which the audio data file is broadcasted by means of the recording/broadcasting module and the text data file and the graphic image file are displayed on the display module.

8. An electronic book apparatus, comprising:
   a display module, displaying contents of an electronic book;
   a touch module, generating a text note or a graphic note;
   an edit-mode control window generated on the display module; and
   a recording/broadcasting module, generating an audio note;
   whereby the text note, the graphic note and the audio note respectively have a corresponding linkage relationship associated with the contents of the electronic book,
   wherein the recording/broadcasting module is activated and the edit-mode control window is opened for simultaneously recording the audio note and at least one of the text note and the graphic note both inputted in the edit-mode control window by a user corresponding to the electronic book apparatus.

9. The apparatus according to claim 8, wherein the display module is one of a liquid crystal display (LCD) panel or a bi-stable display panel, and the bi-stable display panel is an electronic paper.

10. The apparatus according to claim 8, wherein the recording/broadcasting module consists of a recording component and a broadcasting component.

11. The apparatus according to claim 8, further comprising a linkage data stored in a correspondence table which records the corresponding linkage relationship of the text note, the graphic note and the audio note associated with the contents of the electronic book, and the contents of the electronic book can be one of a page, a text, a figure or a form.

12. The apparatus according to claim 8, wherein the display module simultaneously displays the contents of the electronic book and an icon to indicate that one of the audio note, the text note and the graphic note has a corresponding linkage relationship with respect to the contents of the electronic book.

13. The apparatus according to claim 12, wherein the icon is capable of accessing one of an audio data file, a text data file and a graphic image file, in which the audio data file is broadcasted by means of the recording/broadcasting module and the text data file and the graphic image file are displayed on the display module.

14. A control method for an electronic book apparatus, comprising the following steps:
- accessing an electronic book file and displaying the electronic book file on a display module;
- selecting a content displayed on the display module;
- activating a recording/broadcasting module for generating an audio data file;
- generating an edit-mode control window on the display module; and
- storing the generated audio data file in a memory unit and generating a linkage data corresponding to the selected contents to store in a correspondence table,
- wherein the recording/broadcasting module is activated and the edit-mode control window is opened for simultaneously recording the audio note and at least one of a text note and a graphic note both inputted in the edit-mode control window by a user corresponding to the electronic book apparatus.

15. The method according to claim 14, wherein the display module is one of a liquid crystal display (LCD) panel or a bi-stable display panel, and the bi-stable display panel is an electronic paper.

16. The method according to claim 14, wherein the recording/broadcasting module consists of a recording component and a broadcasting component.

17. The method according to claim 14, wherein the linkage data records a corresponding linkage relationship of the audio data file associated with the contents, and the contents can be one of a page, a text, a figure or a form within the electronic book file.

18. The method according to claim 14, further comprising opening the edit-mode control window for generating a text data file or a graphic image file and storing the text data file or the graphic image file in the memory unit, in which one of the text data file and the graphic image file has a corresponding linkage relationship with respect to the contents.

19. The method according to claim 18, wherein the display module simultaneously displays the contents of the electronic book file and an icon to indicate that one of the audio data file, the text data file and the graphic image file has the corresponding linkage relationship with respect to the contents of the electronic book file.

20. The method according to claim 19, wherein the icon is selected by touch to open one of the audio data file, the text data file and the graphic image file, in which the audio data file is broadcasted by means of the recording/broadcasting module and the text data file and the graphic image file are displayed on the display module.

* * * * *